US012775262B2

(12) United States Patent
Machida et al.

(10) Patent No.: US 12,775,262 B2
(45) Date of Patent: Oct. 27, 2026

(54) INFORMATION PROCESSING DEVICE, SYSTEM, INFORMATION PROCESSING METHOD, AND IMAGE GENERATION DEVICE

(71) Applicant: CITIZEN WATCH CO., LTD., Nishitokyo (JP)

(72) Inventors: Minato Machida, Nishitokyo (JP); Yosuke Takahashi, Nishitokyo (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 489 days.

(21) Appl. No.: 18/280,044

(22) PCT Filed: Mar. 4, 2022

(86) PCT No.: PCT/JP2022/009317
§ 371 (c)(1),
(2) Date: Sep. 1, 2023

(87) PCT Pub. No.: WO2022/186369
PCT Pub. Date: Sep. 9, 2022

(65) Prior Publication Data
US 2024/0152111 A1 May 9, 2024

(30) Foreign Application Priority Data
Mar. 4, 2021 (JP) ................................ 2021-034417

(51) Int. Cl.
*B23D 79/02* (2006.01)
*B23Q 15/00* (2006.01)
*G05B 19/18* (2006.01)
*G05B 19/4068* (2006.01)
*G05B 19/4093* (2006.01)

(52) U.S. Cl.
CPC ....... *G05B 19/4068* (2013.01); *G05B 19/182* (2013.01); *G05B 19/40932* (2013.01)

(58) Field of Classification Search
CPC ............. G05B 19/4068; G05B 19/182; G05B 19/40932
(Continued)

(56) References Cited

U.S. PATENT DOCUMENTS

2016/0195139 A1* 7/2016 Inoue .................. F16J 15/3424 384/138
2016/0214143 A1 7/2016 Nagatsuka
(Continued)

FOREIGN PATENT DOCUMENTS

JP 2009-31911 A 2/2009
JP 2013-141709 A 7/2013
(Continued)

OTHER PUBLICATIONS

Hseih et al., "Design, manufacture, and development of a novel automatic scraping machine", published Oct. 20, 2016. Retrieved from https://link.springer.com/article/10.1007/s00170-016-9590-4. Retrieved on Dec. 31, 2025. (Year: 2016).*
(Continued)

*Primary Examiner* — Kamini S Shah
*Assistant Examiner* — Michael V Farina
(74) *Attorney, Agent, or Firm* — Harness, Dickey & Pierce, P.L.C.

(57) ABSTRACT

An information processing device acquires input information including the number of generators, a processing width, and a processing shape. Further, the information processing device sets, in a virtual processing area, a plurality of generators corresponding to the number of generators included in the input information at respective coordinates determined by uniform random numbers. Further, the information processing device forms, in the virtual processing area, a plurality of dividing lines by a prescribed dividing algorithm on a basis of the plurality of generators. Then, the
(Continued)

information processing device generates processing instruction data for causing a processing device to perform scraping to realize a first virtual cutting pattern formed by performing virtual scraping along respective dividing lines on a basis of the processing width and the processing shape included in the input information.

9 Claims, 9 Drawing Sheets

(58) Field of Classification Search
USPC .......................................................... 700/184
See application file for complete search history.

(56) References Cited

U.S. PATENT DOCUMENTS

| | | | | |
|---|---|---|---|---|
| 2016/0224006 | A1* | 8/2016 | Otomo | G05B 19/4097 |
| 2017/0227056 | A1 | 8/2017 | Inoue et al. | |
| 2018/0038411 | A1 | 2/2018 | Inoue et al. | |
| 2022/0276635 | A1 | 9/2022 | Takahashi et al. | |
| 2023/0139651 | A1* | 5/2023 | Mccutcheon | B33Y 50/00 700/98 |

FOREIGN PATENT DOCUMENTS

| | | | |
|---|---|---|---|
| JP | 5806105 | B2 | 11/2015 |
| JP | 2016-137551 | A | 8/2016 |
| JP | 2017-207209 | A | 11/2017 |
| WO | 2021015075 | A1 | 1/2021 |

OTHER PUBLICATIONS

Liang, Xinhe et al; "Tool Path Generation Based on Point Cloud Directly"; China Academic Journal Electronic Publishing House; Mar. 25, 2007 (5 pages).

Chinese Office Action dated Dec. 26, 2025 with English machine translation (corresponding to CN 202280018572.5).

* cited by examiner

INFORMATION PROCESSING DEVICE, SYSTEM, INFORMATION PROCESSING METHOD, AND IMAGE GENERATION DEVICE

CROSS-REFERENCE TO RELATED APPLICATIONS

This application is a National Stage of International Application No. PCT/JP2022/009317, filed Mar. 4, 2022 (now WO 2022/186369A1), which claims priority to Japanese Application No. 2021-034417, filed Mar. 4, 2021. The entire disclosures of each of the above applications are incorporated herein by reference.

FIELD

The present disclosure relates to a technology of performing scraping.

BACKGROUND

Conventionally, “scraping” has been performed on sliding surfaces in working machines or the like. In the scraping, a cutting pattern is formed on a surface to be processed of an object by a plurality of cutting parts. Since oil reservoirs for a lubricant are generated in the plurality of cutting parts formed by the scraping, it is possible to obtain desired sliding performance on a sliding surface.

PTL 1 discloses a technology relating to a processing method by an automatic scraping device. In the processing method described in PTL 1, a cutting position, a cutting length, a cutting width, and a cutting depth are calculated on the basis of the parameter of a desired plane degree for an object to be processed and the 3D curved surface of the contact surface of the object to be processed. Then, a signal about the calculated cutting position, the cutting length, the cutting width, and the cutting depth is transmitted to the automatic scraping device.

PTL 2 discloses a technology relating to a processing device that performs scraping by a robot. In the processing device described in PTL 2, the position and attitude of a metal surface and the positions of irregularity portions of the metal surface are detected using an image captured by a camera. Then, scraping is performed by the robot on the basis of detection results.

PTL 3 discloses a technology relating to a sliding component. In the sliding component described in PTL 3, a plurality of dimples having different opening diameters are arranged so as to be randomly distributed. Further, PTL 3 describes the use of random numbers as a method for randomly distributing the opening diameters of the dimples.

CITATION LIST

Patent Literature

[PTL 1] Japanese Patent Application Laid-open No. 2013-141709
[PTL 2] Japanese Patent Application Laid-open No. 2016-137551
[PTL 3] Japanese Patent Application Laid-open No. 2017-207209

SUMMARY

Technical Problem

Scraping has been generally performed manually, but technologies to realize such scraping by processing devices have been developed in recent years. However, in order to realize oil reservoirs with which it is possible to obtain desired sliding performance on a sliding surface by scraping, a random cutting pattern is required to be formed. Therefore, it has been difficult to realize a suitable cutting pattern by the scraping of a processing device.

The present disclosure has been made in view of the above problem, and has an object of providing a technology to make it possible to perform scraping with a suitable cutting pattern by a scraping device.

Solution to Problem

An information processing device according to a first aspect of the present disclosure includes a data generation unit that performs data generation processing, the data generation processing including: acquiring input information including the number of generators, a processing width, and a processing shape; setting, in a virtual processing area, a plurality of generators corresponding to the number of generators included in the input information at respective coordinates determined by uniform random numbers; forming, in the virtual processing area, a plurality of dividing lines by a prescribed dividing algorithm on a basis of the plurality of generators; and generating, in the virtual processing area, processing instruction data for causing a processing device to perform scraping to realize a first virtual cutting pattern formed by performing virtual scraping along respective dividing lines on a basis of the processing width and the processing shape included in the input information.

A system according to a second aspect of the present disclosure includes: the information processing device according to the first aspect of the present disclosure; and a processing device that performs scraping on a basis of the processing instruction data generated by the information processing device.

An information processing method according to a third aspect of the present disclosure is an information processing method performed by a computer, the information processing method including: acquiring input information including the number of generators, a processing width, and a processing shape; setting, in a virtual processing area, a plurality of generators corresponding to the number of generators included in the input information at respective coordinates determined by uniform random numbers; forming, in the virtual processing area, a plurality of dividing lines by a prescribed dividing algorithm on a basis of the plurality of generators; and generating, in the virtual processing area, processing instruction data for causing a processing device to perform scraping to realize a first virtual cutting pattern formed by performing virtual scraping along respective dividing lines on a basis of the processing width and the processing shape included in the input information.

A program according to a fourth aspect of the present disclosure causes a computer to perform: acquiring input information including the number of generators, a processing width, and a processing shape; setting, in a virtual processing area, a plurality of generators corresponding to the number of generators included in the input information at respective coordinates determined by uniform random numbers; forming, in the virtual processing area, a plurality of dividing lines by a prescribed dividing algorithm on a basis of the plurality of generators; and generating, in the virtual processing area, processing instruction data for causing a processing device to perform scraping to realize a first virtual cutting pattern formed by performing virtual scraping along respective dividing lines on a basis of the processing width and the processing shape included in the input information.

An image generation device according to a fourth aspect of the present disclosure includes an image generation unit that performs: acquiring input information including the number of generators, a processing width, and a processing shape; setting, in a virtual processing area, a plurality of generators corresponding to the number of generators included in the input information at respective coordinates determined by uniform random numbers; forming, in the virtual processing area, a plurality of dividing lines by a prescribed dividing algorithm on a basis of the plurality of generators; and generating, in the virtual processing area, an image showing a first virtual cutting pattern formed by performing virtual scraping along respective dividing lines on a basis of the processing width and the processing shape included in the input information.

Advantageous Effects of the Disclosure

According to the present disclosure, scraping with a suitable cutting pattern is made possible by a scraping device.

DESCRIPTION

Figure 1:
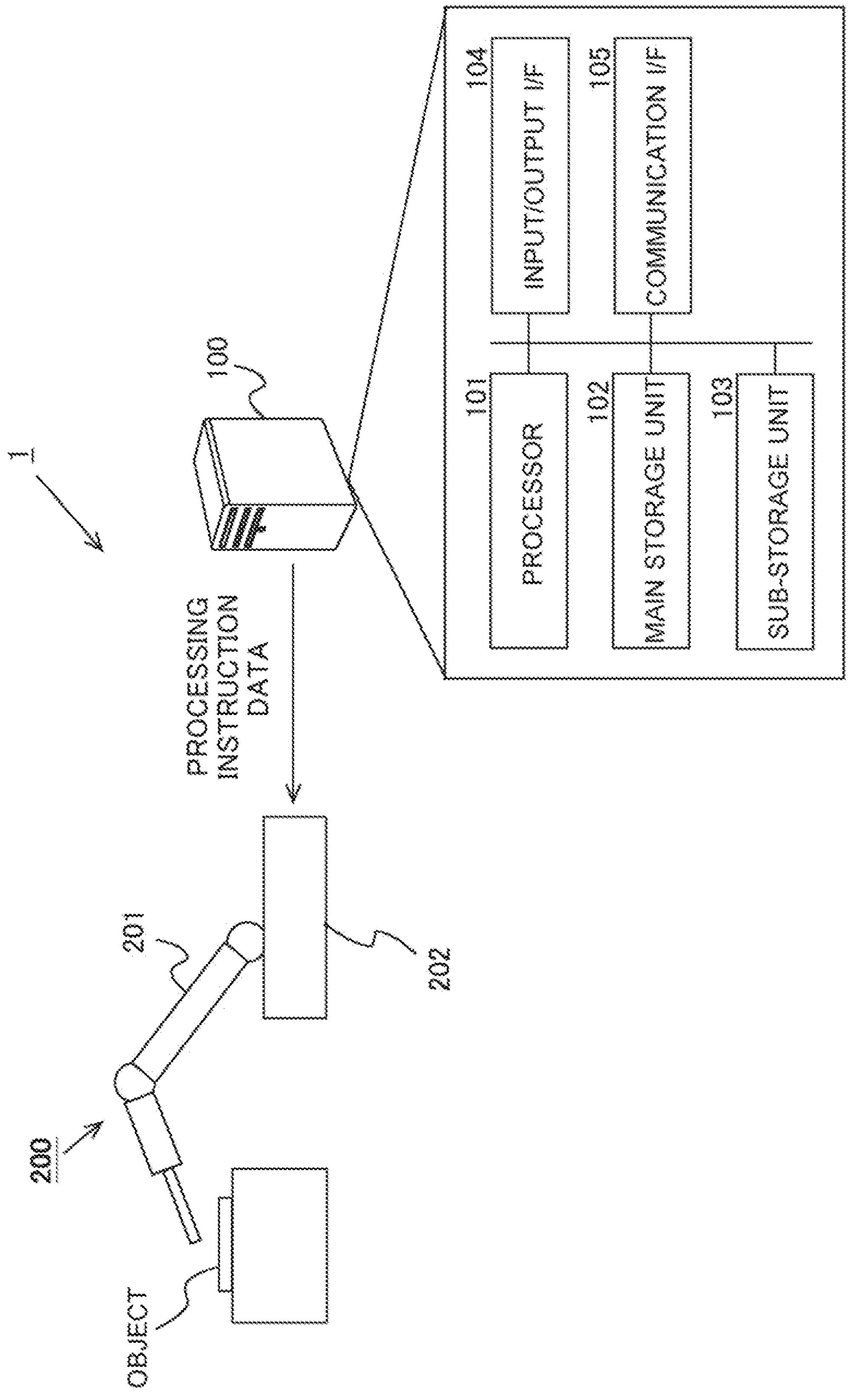
FIG. 1 is a diagram showing the schematic configuration of a processing system according to an embodiment.

An information processing device according to a first aspect of the present disclosure is a device for generating processing instruction data for causing a processing device to perform scraping. The information processing device includes a data generation unit that performs data generation processing. The data generation unit acquires input information including the number of generators, a processing width, and a processing shape. Here, the processing width and processing shape indicate the width and shape of an individual cutting part, respectively, in a cutting pattern formed by scraping.

Further, the data generation unit sets, in a virtual processing area, a plurality of generators corresponding to the number of generators included in the input information at respective coordinates determined by uniform random numbers. Here, the virtual processing area is an area to be processed by virtual scraping. In the virtual processing area, the plurality of generators are set at the respective coordinates determined by the uniform random numbers. As a result, the generators corresponding to the number of generators included in the input information are randomly distributed in the substantially whole virtual processing area.

In addition, the data generation unit forms a plurality of dividing lines by a prescribed dividing algorithm on the basis of the plurality of generators in the virtual processing area. Here, the prescribed dividing algorithm is an algorithm by which a plurality of dividing lines for dividing a plane are formed on the basis of a plurality of points set on the plane. The respective dividing lines are formed on the basis of the plurality of generators randomly distributed in the substantially whole virtual processing area. As a result, the plurality of dividing lines having random individual lengths and random extending directions are randomly distributed in the substantially whole virtual processing area.

Here, in the virtual processing area, a virtual cutting pattern formed by performing scraping along the respective dividing lines on the basis of the processing width and processing shape included in the input information is called a "first virtual cutting pattern." When virtual scraping is performed along a plurality of dividing lines that have random individual lengths and random extending directions and that are randomly distributed as described above, a random virtual cutting pattern is formed. Accordingly, the first virtual cutting pattern becomes a random pattern.

Therefore, the data generation unit generates processing instruction data for causing the processing device to perform scraping to realize the first virtual cutting pattern. By the generation of such processing instruction data, the processing device can be caused to perform scraping with a random cutting pattern. Accordingly, it is possible to perform scraping with a suitable cutting pattern by the processing device. Further, it is possible to perform scraping with various cutting patterns by the processing device by changing the number of generators, a processing width, and a processing shape serving as input information.

Hereinafter, specific embodiments of the present disclosure will be described on the basis of the drawings. The dimensions, materials, shapes, relative arrangements, or the like of constituting components described in the present embodiment do not intend to limit the technical scope of the disclosure unless otherwise specifically described.

First Embodiment (Schematic Configuration of System)

FIG. 1 is a diagram showing the schematic configuration of a processing system according to the present embodiment. As shown in FIG. 1, a processing system 1 includes an information processing device 100 and a scraping device 200. Note that in the present embodiment, the information processing device 100 corresponds to an "information processing device" according to the present disclosure, and the scraping device 200 corresponds to a "processing device" according to the present disclosure. Further, in the present embodiment, the processing system 1 corresponds to a "system" according to the present disclosure.

The scraping device 200 is a device that automatically performs scraping on a surface to be processed (metal surface) of an object. The scraping device 200 is configured to include a robot hand 201 and a control device 202. The robot hand 201 has a scraping tool attached at its tip end. The control device 202 controls the robot hand 201 on the basis of input processing instruction data. Scraping is performed on a surface to be processed of an object as the robot hand 201 is controlled by the control device 202. That is, the scraping device 200 performs scraping corresponding to processing instruction data input to the control device 202.

Note that the configuration of the “processing device” according to the present disclosure is not limited to a configuration having a robot hand like the scraping device 200. Any known configuration may be employed as the configuration of the “processing device” according to the present disclosure so long as scraping can be performed on the basis of input processing instruction data.

The information processing device 100 is a device used to generate processing instruction data to be input to the control device 202 of the scraping device 200. Processing instruction data generated by the information processing device 100 is transmitted from the information processing device 100 to the scraping device 200. Note that the transmission of processing instruction data from the information processing device 100 to the scraping device 200 may be performed through wired communication or wireless communication.

The information processing device 100 is configured to include a general computer. A computer constituting the information processing device 100 has a processor 101, a main storage unit 102, a sub-storage unit 103, an input/output interface (input/output I/F) 104, and a communication interface (communication I/F) 105.

Here, the processor 101 is, for example, a CPU (Central Processing Unit) or a DSP (Digital Signal Processor). The main storage unit 102 is, for example, a RAM (Random Access Memory). The sub-storage unit 103 is, for example, a ROM (Read Only Memory), an HDD (Hard Disk Drive), or a flash memory. Further, the sub-storage unit 103 may include a removable medium (transportable recording medium). Here, the removable medium is, for example, a USB flash drive, an SD card, or a disk recording medium such as a CD-ROM, a DVD disk, and a Blue-ray disk. The input/output I/F 104 is, for example, a touch panel display. The communication I/F 105 is, for example, a LAN (Local Area Network) interface board or a wireless communication circuit for wireless communication.

The sub-storage unit 103 stores an operating system (OS), various programs, various information tables, or the like. Further, various processing such as processing to generate processing instruction data as will be described later is realized when the processor 101 loads a program stored in the sub-storage unit 103 into the main storage unit 102 and runs the same. However, some or all of the functions of the information processing device 100 may be realized by a hardware circuit such as an ASIC and an FPGA.

Note that the information processing device 100 is not necessarily realized by a single physical configuration but may be configured by a plurality of computers that cooperate with each other. Further, a configuration in which the scraping device 200 and the information processing device 100 are integrated with each other can be employed.

(Function Configurations)

Figure 2:
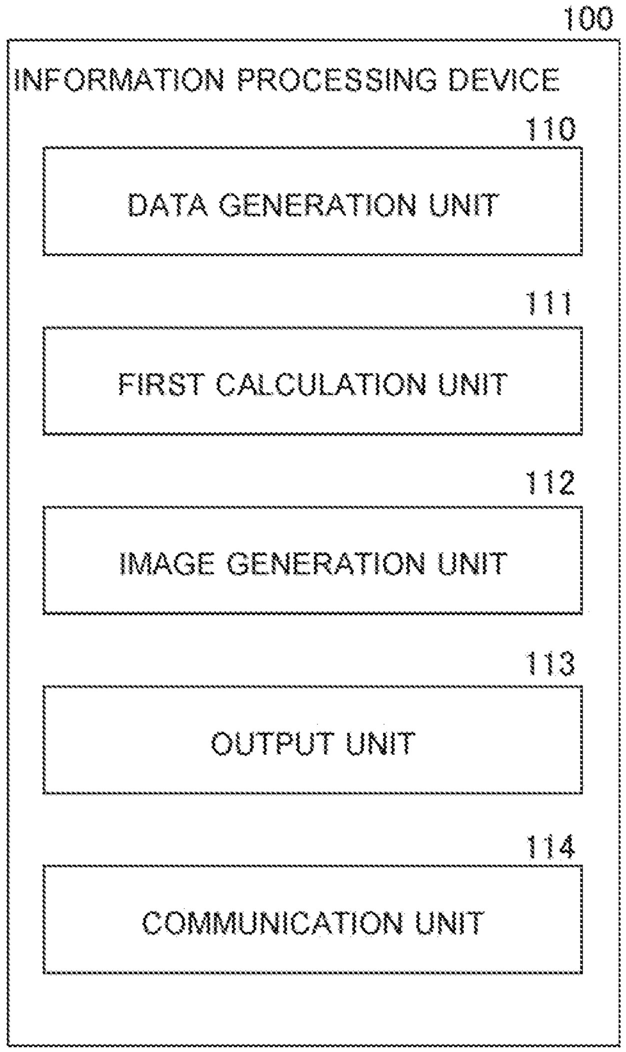
FIG. 2 is a block diagram schematically showing an example of the function configurations of an information processing device according to the first embodiment.

Next, the function configurations of the information processing device 100 will be described on the basis of FIG. 2. FIG. 2 is a block diagram schematically showing an example of the function configurations of the information processing device 100 according to the present embodiment. The information processing device 100 has a data generation unit 110, a first calculation unit 111, an image generation unit 112, an output unit 113, and a communication unit 114 as function units.

The data generation unit 110 has the function of performing data generation processing to generate processing instruction data. Note that the processing instruction data is specifically data showing the coordinates of a processing start point, a processing direction, a processing depth (magnitude of a force), a processing length, or the like when respective cutting parts are cut out by a cutting tool at the time of performing scraping on a surface to be processed of an object by the scraping device 200.

Figure 3:
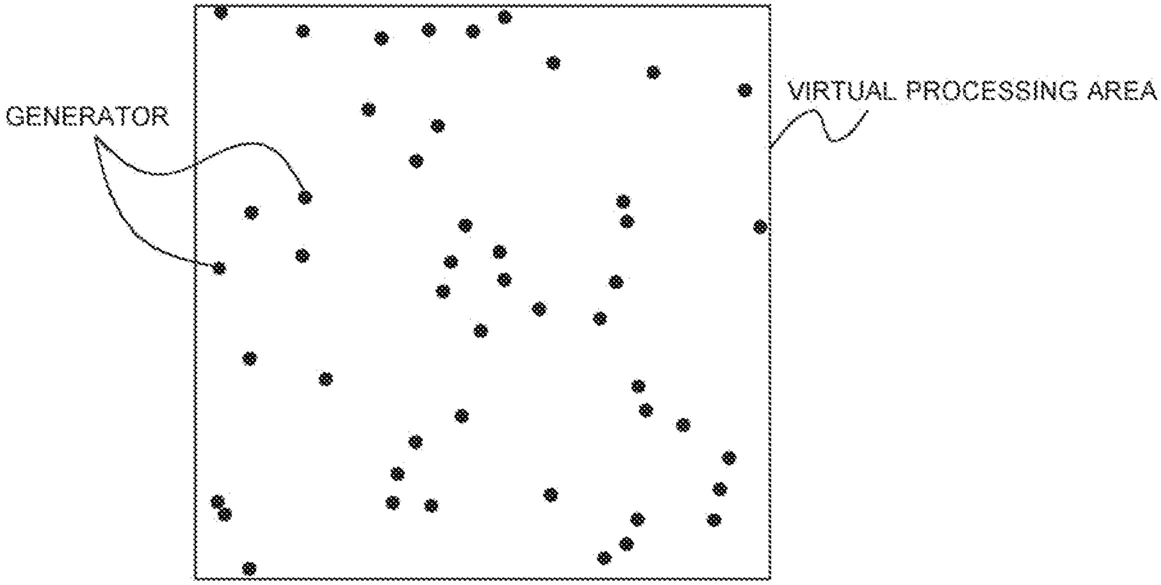
FIG. 3 is a first diagram showing the state of a virtual processing area.
Figure 4:
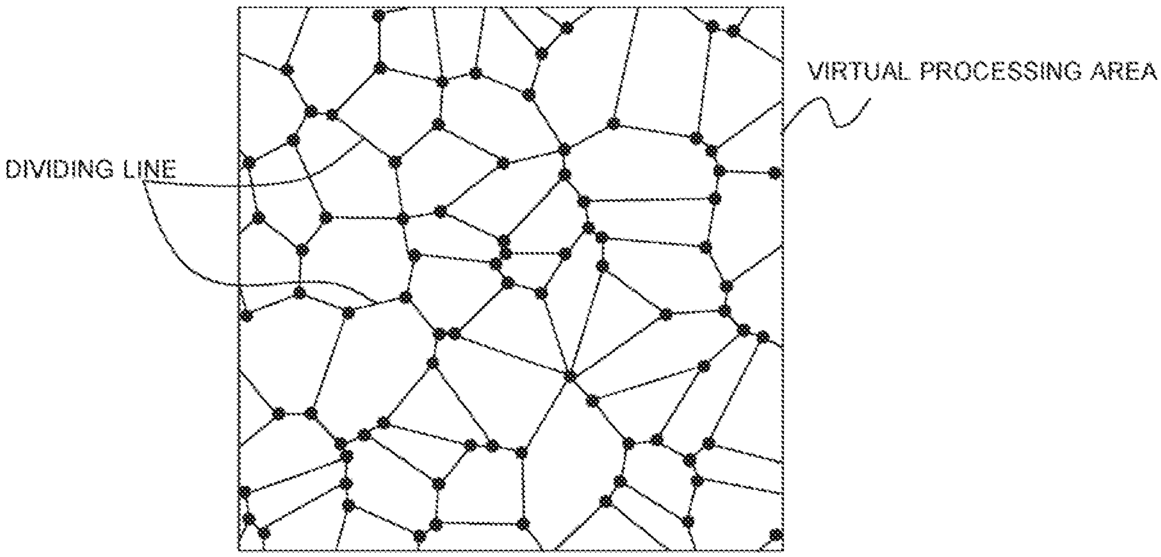
FIG. 4 is a second diagram showing the state of a virtual processing area.
Figure 5A:
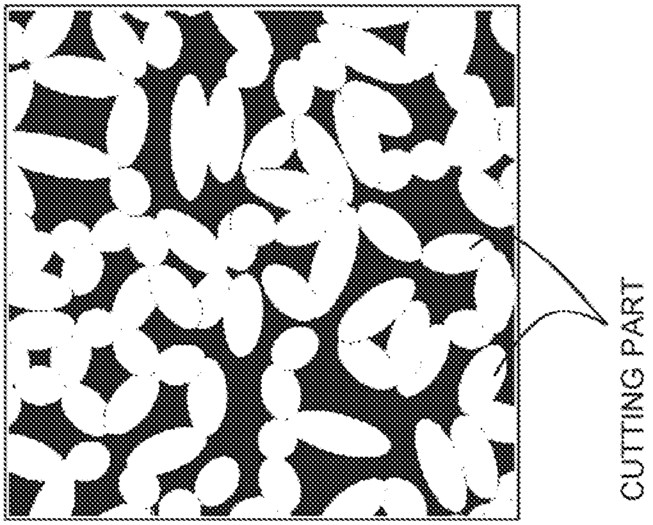
FIG. 5 is a third diagram showing the state of a virtual processing area.
Figure 5B:
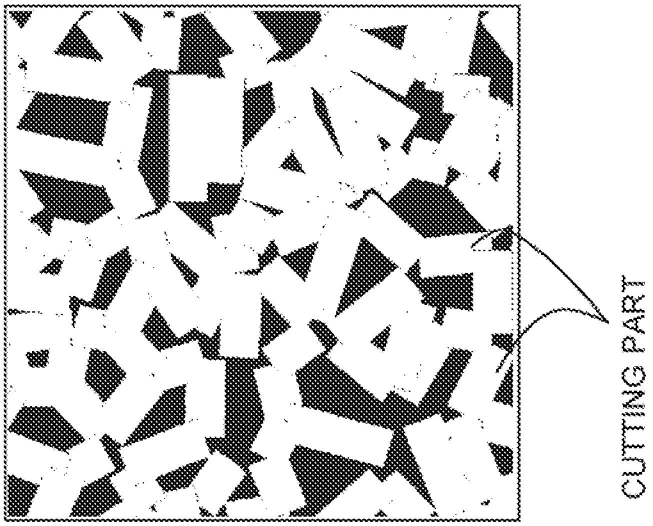
Figure 5C:
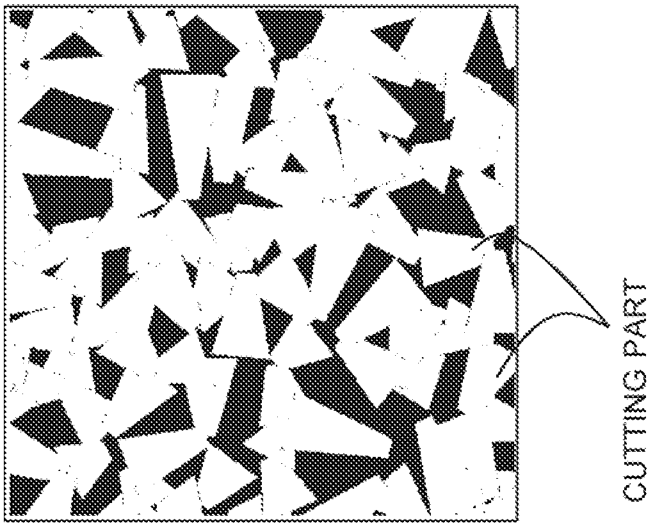

Hereinafter, data generation processing performed by the data generation unit 110 will be described on the basis of FIG. 3 to FIG. 5. FIG. 3 to FIG. 5 are diagrams each showing the state of a virtual processing area used in data generation processing. Here, the virtual processing area is an area to be subjected to virtual scraping. The virtual processing area may be stored in the information processing device 100 as an area set in advance. Further, the virtual processing area may be set as an area corresponding to a surface to be processed of an object in actual scraping by the scraping device 200.

In data generation processing, input information including parameters for performing the processing is first acquired. The parameters included in the input information are specifically the number of generators, a processing width, and a processing shape. Here, the processing width and the processing shape show the width and shape of an individual cutting part, respectively, in a cutting pattern formed by scraping. The processing width and processing shape included in the input information correspond to the width and shape of an individual cutting part, respectively, in a cutting pattern formed on a surface to be processed of an object by scraping actually performed by the scraping device 200.

The processing shape is, for example, a rectangle, a trapezoid, an ellipse, or a lune. Further, the processing width in an individual cutting part is not necessarily constant depending on the processing shape. Therefore, the processing width serving as the input information may be stipulated as a width at a position set in advance in an individual cutting part according to the processing shape. Further, the number of generators is the number of generators used in the data generation processing. The generators will be described in detail later. Note that in the present embodiment, input information including the number of generators, a processing width, and a processing shape may be input by a user through the input/output I/F 104 in the information processing device 100.

In the data generation processing, a plurality of generators corresponding to the number of generators included in the input information are next set at respective coordinates determined by uniform random numbers in a virtual processing area. FIG. 3 is a diagram showing an example of a state in which a plurality of generators corresponding to the number of generators included in input information are set in a virtual processing area. In FIG. 3, a plurality of generators inside a virtual processing area show generators. The respective coordinates of the plurality of generators are determined by uniform random numbers. As a result, generators corresponding to the number of generators included in input information are randomly distributed in the substantially whole virtual processing area as shown in FIG. 3.

In the data generation processing, a plurality of dividing lines are next formed by a prescribed dividing algorithm on the basis of the plurality of generators in the virtual processing area. FIG. 4 shows a state in which a plurality of dividing lines are formed on the basis of the plurality of generators shown in FIG. 3. In FIG. 4, a plurality of line segments inside the virtual processing area show dividing lines. Here, the prescribed dividing algorithm is an algorithm by which a plurality of dividing lines for dividing a plane are formed on the basis of a plurality of points set on the plane. As the prescribed dividing algorithm, Voronoi division or Delaunay division can be exemplified. However, the prescribed dividing algorithm is not limited to these algorithms. Note that FIG. 4 shows the state of a case in which a plurality of dividing lines are formed by Voronoi division on the basis of the plurality of generators shown in FIG. 3. The respective dividing lines are formed on the basis of the plurality of generators randomly distributed in the substantially whole virtual processing area. As a result, the plurality of dividing lines having random individual lengths and random extending directions are randomly distributed in the substantially whole virtual processing area as shown in FIG. 4.

In the data generation processing, processing instruction data for causing the scraping device 200 to perform scraping to realize a first virtual cutting pattern is next generated. Here, the first virtual cutting pattern is a virtual cutting pattern formed when virtual scraping is performed along respective dividing lines on the basis of a processing width and a processing shape included in input information in a virtual processing area.

FIG. 5 is a diagram showing three examples of a first virtual cutting pattern. FIG. 5(*a*) shows a first virtual cutting pattern in a case where a processing shape included in input information is an ellipse. Therefore, individual cutting parts (virtual cutting parts) have an elliptic shape in FIG. 5(*a*). Further, FIG. 5(*b*) shows a first virtual cutting pattern in a case where a processing shape included in input information is a rectangle. Therefore, individual cutting parts have a rectangular shape in FIG. 5(*b*). Further, FIG. 5(*c*) shows a first virtual cutting pattern in a case where a processing shape included in input information is a trapezoid. Therefore, individual cutting parts have a trapezoidal shape in FIG. 5(*c*). Note that FIGS. 5(*a*), 5(*b*), and 5(*c*) all show the first virtual cutting patterns formed when virtual scraping is performed along the plurality of dividing lines in the virtual processing area shown in FIG. 4.

In a virtual processing area, virtual scraping is performed along a plurality of dividing lines that have random individual lengths and random extending directions and that are randomly distributed. As a result, the first virtual cutting patterns become random patterns as shown in FIGS. 5(*a*), 5(*b*), and 5(*c*). Therefore, processing instruction data generated as data corresponding to a first virtual cutting pattern in data generation processing becomes data for causing the scraping device 200 to perform scraping with a random cutting pattern.

Further, the first calculation unit 111 has the function of calculating a contact area ratio and the number of contact points corresponding to a first virtual cutting pattern described above. Here, a cutting pattern formed when scraping is performed on a surface to be processed of an object by the processing device 200 on the basis of processing instruction data generated by the data generation unit 110 is called an actual cutting pattern. The contact area ratio and the number of contact points corresponding to a first virtual cutting pattern are equivalent to a contact area ratio and the number of contact points realized by this actual cutting pattern, respectively. Note that the contact area ratio may be expressed as the area ratio of contact surfaces (protruding parts) in a surface to be processed formed by scraping. Further, the number of contact points may be expressed as the number of contact surfaces (protruding parts) in a surface to be processed formed by scraping.

Further, the image generation unit 112 has the function of generating an image showing a first virtual cutting pattern described above. As described in the above data generation processing by a data generation unit 110, it is possible to derive first virtual cutting patterns as exemplified in FIGS. 5(*a*), 5(*b*), and 5(*c*) on the basis of input information including the number of generators, a processing width, and a processing shape. In view of this, the first calculation unit 111 calculates a contact area ratio and the number of contact points corresponding to a first virtual cutting pattern on the basis of input information. Further, the image generation unit 112 generates an image showing a first virtual cutting pattern on the basis of input information. Note that the data generation unit 110, the first calculation unit 111, and the image generation unit 112 can be realized by the processor 101.

Further, the output unit 113 has the function of outputting a contact area ratio and the number of contact points corresponding to a first virtual cutting pattern calculated by the first calculation unit 111 and an image showing the first virtual cutting pattern generated by the image generation unit 112. Note that the output unit 113 can be realized by the input/output I/F 104.

Further, the communication unit 114 has the function of transmitting processing instruction data generated by the data generation unit 110 to the scraping device 200. Note that the communication unit 114 can be realized by the communication I/F 105.

(Flows of Information Processing)

Figure 6:
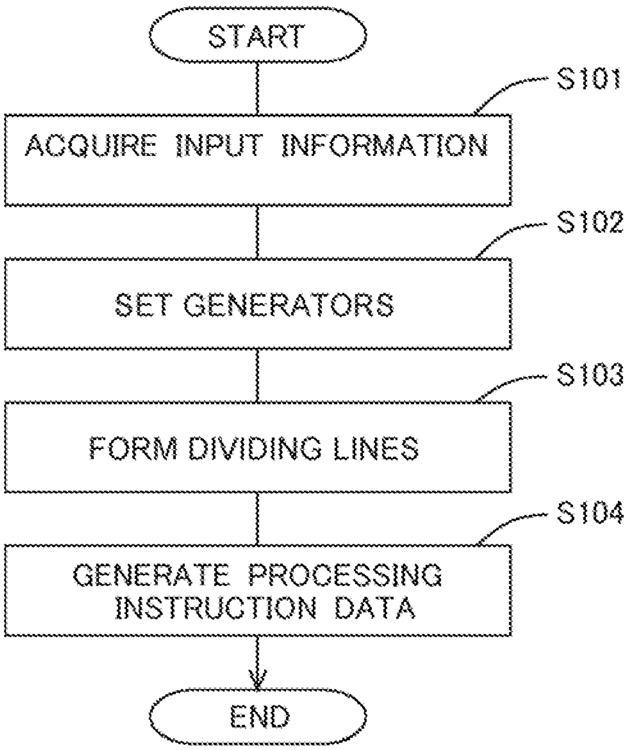
FIG. 6 is a flowchart showing the flow of data generation processing.

Next, the flows of information processing performed by the information processing device 100 according to the present example will be described on the basis of FIG. 6 and FIG. 7. FIG. 6 is a flowchart showing the flow of data generation processing performed by the data generation unit 110.

In the flow shown in FIG. 6, input information including the number of generators, a processing width, and a processing shape is first acquired in S101. Next, in S102, generators corresponding to the number of generators included in the input information are set in a virtual processing area. At this time, coordinates at which the respective generators are set are determined by automatically-generated uniform random numbers. Next, in S103, a plurality of dividing lines are formed by a prescribed dividing algorithm on the basis of the plurality of generators (corresponding to the number of generators) set in the virtual processing area in S102. Next, in S104, processing instruction data for causing the scraping device 200 to perform scraping to realize a first virtual cutting pattern is generated. At this time, the first virtual cutting pattern is a virtual cutting pattern corresponding to the processing width and the processing shape included in the input information and the plurality of dividing lines formed in the virtual processing area in S102.

The processing instruction data generated by the above data generation processing is transmitted to the scraping device 200 by the communication unit 114. Then, scraping is actually performed on a surface to be processed of an object by the scraping device 200 on the basis of the processing instruction data received from the information processing device 100. Thus, an actual cutting pattern equivalent to the first virtual cutting pattern is formed on the surface to be processed of the object. That is, the scraping device 200 can be caused to perform scraping with a random cutting pattern on the basis of the processing instruction data generated by the information processing device 100. Further, the information processing device 100 can be caused to generate processing instruction data with various patterns by changing the number of generators, a processing width, and a processing shape input as input information. As a result, it is possible to cause the processing device 200 to perform scraping with various cutting patterns.

Figure 7:
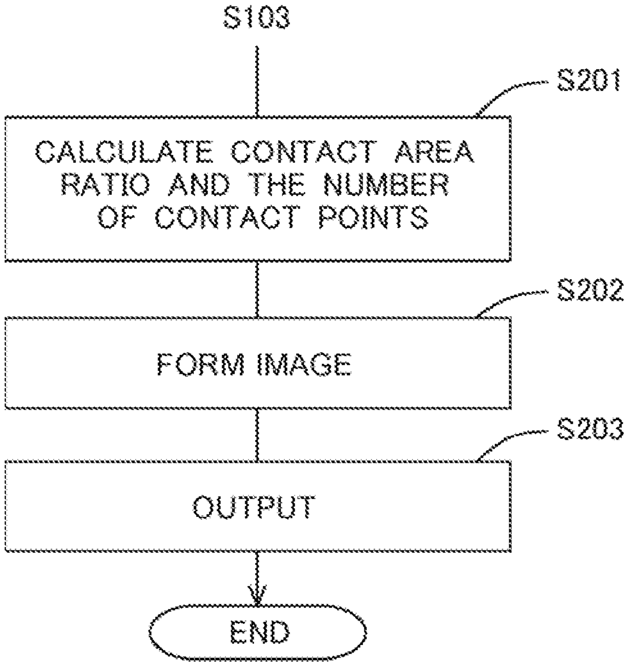
FIG. 7 is a flowchart showing the flow of information processing other than the data generation processing.

Further, FIG. 7 is a flowchart showing the flow of processing performed by the first calculation unit 111, the image generation unit 112, and the output unit 113. Note that this flow is performed in succession to the processing of S103 in the flow of the data generation processing shown in FIG. 6. Therefore, the processing of S104 in the flow shown in FIG. 6 and information processing shown in FIG. 7 may be performed in parallel by the information processing device 100.

In this flow, a contact area ratio and the number of contact points corresponding to a first virtual cutting pattern are calculated in S201. Next, in S202, an image showing the first virtual cutting pattern is generated. Next, in S203, a contact area ratio and the number of contact points corresponding to the first virtual cutting pattern that are calculated in S210 and the image showing the first virtual cutting pattern generated by the image generation unit 112 in S202 are output.

As a result of the output of data as described above to the output unit 113 according to the information processing shown in FIG. 7, it is possible for a user to grasp a cutting pattern realized on the basis of processing instruction data corresponding to input information as a specific numerical value and an image. Note that the information processing device 100 according to the present embodiment can be grasped as an "image generation device" according to the present disclosure.

Further, the transmission of processing instruction data from the information processing device 100 to the scraping device 200 may be performed after instructions to transmit the processing instruction data are received from the user. Thus, the user can determine whether to transmit processing instruction data from the information processing device 100 to the scraping device 200 after confirming a contact area ratio and the number of contact points corresponding to a first virtual cutting pattern and an image showing the first virtual cutting pattern that are output by the output unit 113. Further, the user can adjust input information to be input to the information processing device 100 in order to cause the scraping device 200 to realize scraping with a desired area ratio, the desired number of contact points, and a desired cutting pattern.

Second Embodiment

The schematic configuration of the processing system of the present embodiment is the same as that of the first embodiment. In the present embodiment, cutting pattern information showing a contact area ratio, the number of contact points, and a processing shape in a desired cutting pattern is input to an information processing device 100. Here, the desired cutting pattern is a cutting pattern to be realized by the scraping of a scraping device 200 desired by a user.

Figure 8:
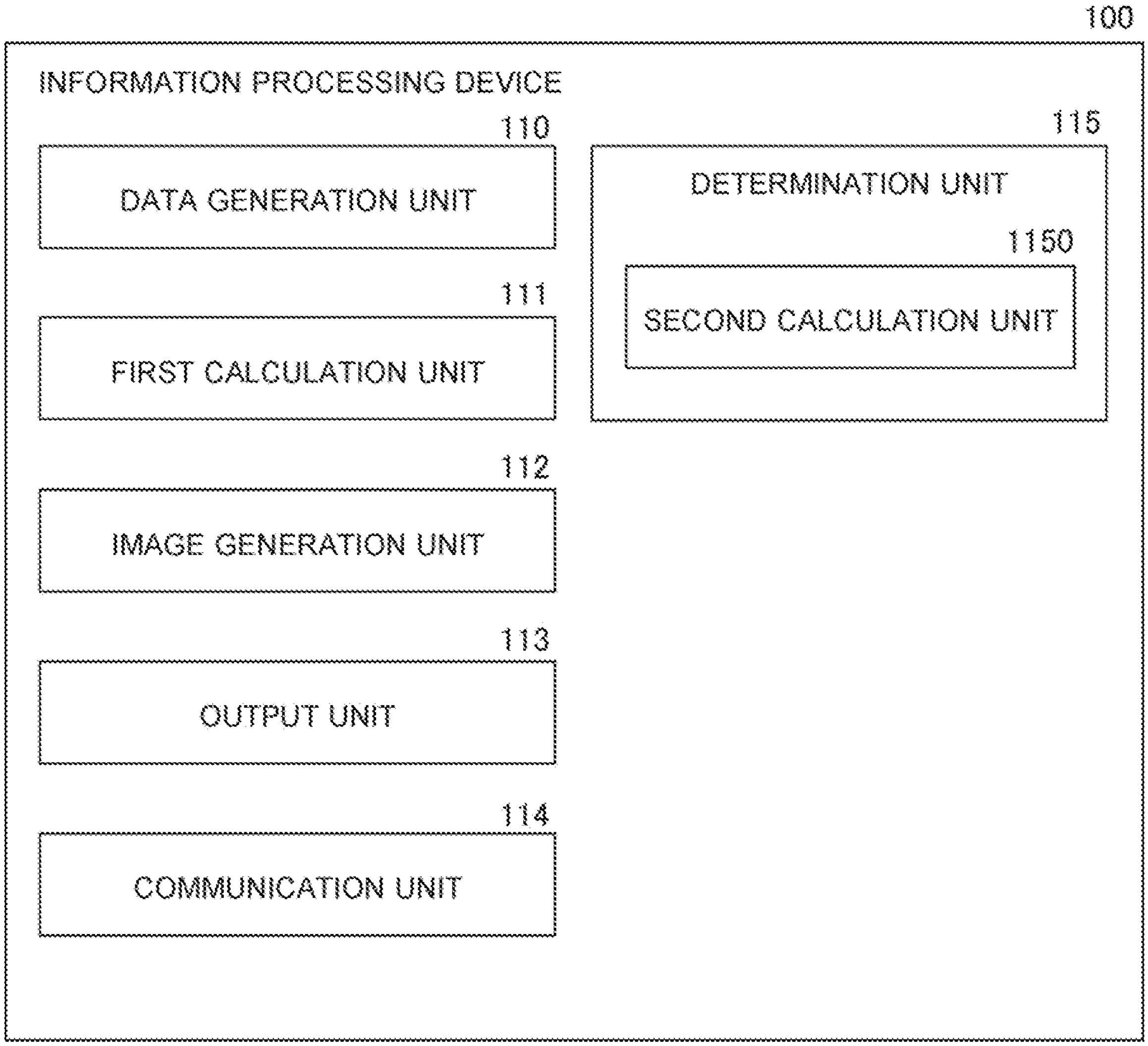
FIG. 8 is a block diagram schematically showing an example of the function configurations of an information processing device according to a second embodiment.
Figure 9:
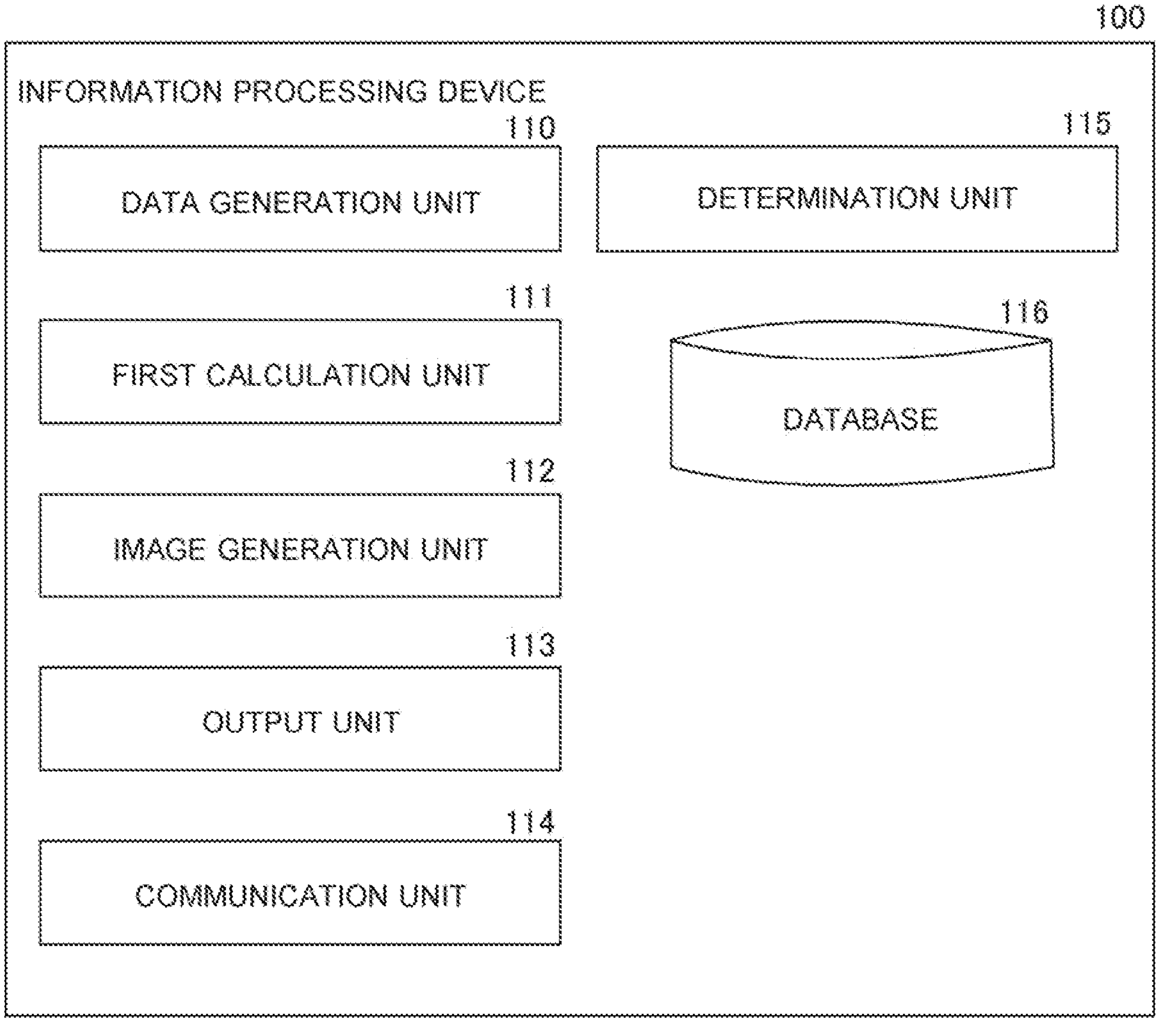
FIG. 9 is a block diagram schematically showing an example of the function configurations of the information processing device according to a modified example of the second embodiment.

FIG. 8 is a block diagram schematically showing an example of the function configurations of the information processing device 100 according to the present embodiment. In the present embodiment, the information processing device 100 has a determination unit 115 as a function unit in addition to a data generation unit 110, a first calculation unit 111, an image generation unit 112, an output unit 113, and a communication unit 114. Here, the determination unit 115 has the function of determining input information to be applied to data generation processing by the data generation unit 110. The determination unit 115 determines input information on the basis of cutting pattern information input to the information processing device 100. Note that the determination unit 115 can be realized by a processor 101.

Specifically, the determination unit 115 includes a second calculation unit 1150. The second calculation unit 1150 has the function of calculating a contact area ratio and the number of contact points in a virtual cutting pattern corresponding to the number of generators, a processing width, and a processing shape. Note that a method for calculating a contact area ratio and the number of contact points performed by the second calculation unit 1150 is the same as the method for calculating these values performed by the first calculation unit 111 described above.

Then, in the determination unit 115, the second calculation unit 1150 performs the calculation of a contact area ratio and the number of contact points in a virtual cutting pattern a plurality of times, while changing the value of at least any of the number of generators and a processing width. The calculation of a contact area ratio and the number of contact points by the second calculation unit 1150 is repeatedly performed until values, which fall within a prescribed range with respect to a contact area ratio and the number of contact points in cutting pattern information about a desired cutting pattern, are calculated. Then, the determination unit 115 determines, as a contact area ratio and the number of contact points in the virtual cutting pattern, input information on the basis of the number of generators, a processing width, and a processing shape obtained in a case where the values, which fall within a prescribed range with respect to the contact area ratio and the number of contact points in the cutting pattern information about the desired cutting pattern, are calculated. Note that the number of generators, a processing width, and a processing shape satisfying both a contact area ratio and the number of contact points in cutting pattern information about a desired cutting pattern are not necessarily required to be calculated. That is, when the value of any of a contact area ratio and the number of contact points calculated by the second calculation unit 1150 falls within a prescribed range with respect to a value in cutting pattern information about a desired cutting pattern, the calculation of a contact area ratio and the number of contact points by the second calculation unit 1150 may be ended. Then, the determination unit 115 may determine input information on the basis of the number of generators, a processing width, and a processing shape at this time.

When input information is determined by the determination unit 115, the information processing shown in FIG. 6 and FIG. 7 is performed by the information processing device 100 like the first embodiment. That is, processing instruction data is generated on the basis of the input information determined by the determination unit 115. Accordingly, processing instruction data for realizing a desired cutting pattern or a cutting pattern close to the desired cutting pattern can be generated by the scraping of the scraping device 200.

Modified Example 1

Next, a modified example 1 of the present embodiment will be described. FIG. 8 is a block diagram schematically showing an example of the function configurations of the information processing device 100 according to a modified example 1 of the present embodiment. In this modified example, the information processing device 100 has a database 116 in addition to the data generation unit 110, the first calculation unit 111, the image generation unit 112, the output unit 113, the communication unit 114, and the determination unit 115. Note that in this modified example, the second calculation unit 1150 shown in FIG. 7 is not included in the determination unit 115.

Here, the database 116 stores the correlation between a contact area ratio, the number of contact points, and a processing shape in a cutting pattern and the number of generators and a processing width. The correlation between these values stored in the database 116 can be calculated in advance on the basis of a simulation or the like. Note that the database 116 can be realized by a sub-storage unit 103.

Then, the determination unit 115 derives the number of generators and a processing width on the basis of a contact area ratio, the number of contact points, and a processing shape in cutting pattern information about a desired cutting pattern and a correlation stored in the database 116. The number of generators and a processing width thus derived are determined as input information. Further, in this modified example as well, processing instruction data is generated on the basis of input information determined by the determination unit 115. Thus, processing instruction data for realizing a desired cutting pattern or a cutting pattern close to the desired cutting pattern can be generated by the scraping of a scraping device 200.

Modified Example 2

Next, a modified example 2 of the present embodiment will be described. In this modified example, the data generation unit 110 itself has the function of calculating a contact area ratio and the number of contact points in a virtual cutting pattern corresponding to the number of generators, a processing width, and a processing shape. Therefore, in this modified example, the information processing device 100 is not required to have the first calculation unit 111 and the determination unit 115 aside from the data generation unit 110. Further, in this modified example, a contact area ratio and the number of contact points falling within a prescribed range with respect to a contact area ratio and the number of contact points in cutting pattern information about a desired cutting pattern are regarded as a desired contact area ratio and the desired number of contact points, respectively.

Then, the data generation unit 110 repeatedly performs the calculation of a contact area ratio and the number of contact points in a first virtual cutting pattern, while changing the value of at least any of the number of generators and a processing width serving as input information. At this time, a processing shape in the input information is regarded as a processing shape in cutting pattern information about a desired cutting pattern. Note that a method for calculating a contact area ratio and the number of contact points performed at this time is the same as the method for calculating these values performed by the first calculation unit 111 described above. The data generation unit 110 repeatedly performs the above calculation until a desired contact area ratio and the desired number of contact points are obtained as calculation results.

Further, in this modified example, processing instruction data for causing the processing device 200 to perform scraping to realize a first virtual cutting pattern in a case where a desired contact area ratio and the desired number of contact points are calculated is generated by the data generation unit 110. Thus, processing instruction data for realizing a desired cutting pattern or a cutting pattern close to the desired cutting pattern can be generated by the scraping of the scraping device 200.

Note that in the above embodiment, a processing shape included in input information is not necessarily limited to one type of a shape. That is, a plurality of types of processing shapes may be included in input information.

Other Embodiments

The above embodiments are given only as an example, and the present disclosure can be appropriately modified and implemented without departing from its gist. Further, the processing or means described in the present disclosure can be freely combined together and implemented so long as no technical contradiction arises.

Further, processing described as being performed by one device may be shared and performed by a plurality of devices. Alternatively, processing described as being performed by different devices may be performed by one device. In a computer system, hardware configurations (server configurations) that realize respective functions are flexibly changeable.

The present disclosure is also realizable in such a manner that a computer program having the functions described in the above embodiments is supplied to a computer, and one or more processors provided in the computer read and run the program. Such a computer program may be provided to a computer through a non-transitory computer-readable storage medium connectable to the system bus of a computer, or may be provided to a computer via a network. The non-transitory computer-readable storage medium includes, for example, any type of a disk such as a magnetic disk (such as a Floppy™ disk and a hard disk drive (HDD)) and an optical disk (such as a CD-ROM, a DVD disk, and a Blue-ray disk) and any type of a medium suitable to store electronic instructions such as a read-only memory (ROM), a random access memory (RAM), an EPROM, an EEPROM, a magnetic card, a flash memory, and an optical card.

REFERENCE SIGNS LIST

1 Processing system
100 Information processing device
110 Data generation unit
111 First calculation unit
112 Image generation device
113 Output unit
114 Communication unit
115 Determination unit
1150 Second calculation unit
116 Database
200 Scraping device

The invention claimed is:

1. An information processing device comprising a controller configured to perform data generation processing, the data generation processing including:

acquiring input information including a number of generators, a processing width, and a processing shape;

setting, in a virtual processing area, a plurality of generators corresponding to the number of generators included in the input information at respective coordinates determined by uniform random numbers;

forming, in the virtual processing area, a plurality of dividing lines by a prescribed dividing algorithm, which is an algorithm by which a plurality of dividing lines for dividing a plane are formed on the basis of a plurality of points set on a plane, on a basis of the plurality of generators; and generating, in the virtual processing area, processing instruction data for causing a processing device to perform scraping to realize a first virtual cutting pattern formed by performing virtual scraping along respective dividing lines on a basis of the processing width and the processing shape included in the input information, wherein the controller further performs determination processing for determining the input information on a basis of cutting pattern information showing a contact area ratio, a number of contact points, and a processing shape in a desired cutting pattern, the controller, in the determination processing, repeatedly calculates the contact area ratio and the number of contact points until a difference between at least one of the calculated contact area ratio and the calculated number of contact points and a corresponding value in the desired cutting pattern falls within a prescribed range, while changing a value of at least one of the number of generators and a processing width, and, when the difference falls within the prescribed range, determines the input information based on the number of generators, the processing width, and the processing shape at that time, and the controller generates the processing instruction data on the basis of the input information determined in the determination processing.

2. The information processing device according to claim 1, wherein the controller further performs first calculation processing for calculating the contact area ratio and the number of contact points corresponding to the first virtual cutting pattern.

3. The information processing device according to claim 1, further comprising:

a storage unit configured to store a correlation between a contact area ratio, the number of contact points, and a processing shape in a cutting pattern and the number of generators and a processing width, wherein the controller, in the determination processing, determines the input information by deriving the number of generators and a processing width corresponding to the contact area ratio and the number of contact points in the cutting pattern information about the desired cutting pattern on a basis of the correlation stored in the storage.

4. The information processing device according to claim 1, wherein the controller further performs image generation processing for generating an image showing the first virtual cutting pattern.

5. The information processing device according to claim 1, wherein the data generation processing further includes calculating the contact area ratio and the number of contact points corresponding to the first virtual cutting pattern, and the controller generates data for causing the processing device to perform scraping to realize the first virtual cutting pattern in a case where a desired contact area ratio and a desired number of contact points are calculated in the data generation processing.

6. A system comprising:

the information processing device according to claim 1; and a scraping device that performs scraping on a basis of the processing instruction data generated by the information processing device.

7. An information processing method performed by a computer, the information processing method comprising:

acquiring input information including a number of generators, a processing width, and a processing shape;

setting, in a virtual processing area, a plurality of generators corresponding to the number of generators included in the input information at respective coordinates determined by uniform random numbers;

forming, in the virtual processing area, a plurality of dividing lines by a prescribed dividing algorithm, which is an algorithm by which a plurality of dividing lines for dividing a plane are formed on the basis of a plurality of points set on a plane, on a basis of the plurality of generators; and generating, in the virtual processing area, processing instruction data for causing a processing device to perform scraping to realize a first virtual cutting pattern formed by performing virtual scraping along respective dividing lines on a basis of the processing width and the processing shape included in the input information, wherein the information processing method further comprises performing determination processing for determining the input information on a basis of cutting pattern information showing a contact area ratio, the number of contact points, and a processing shape in a desired cutting pattern, in the determination processing, the contact area ratio and the number of contact points are repeatedly calculated until a difference between at least one of the calculated contact area ratio and the calculated number of contact points and a corresponding value in the desired cutting pattern falls within a prescribed range, while changing a value of at least one of the number of generators and a processing width, and, when the difference falls within the prescribed range, the input information based on the number of generators, the processing width, and the processing shape at that time are determined, and the processing instruction data is generated on the basis of the input information determined in the determination processing.

8. A non-transitory computer-readable medium that stores a program for causing a computer to execute an information processing method comprising:

acquiring input information including a number of generators, a processing width, and a processing shape;

setting, in a virtual processing area, a plurality of generators corresponding to the number of generators included in the input information at respective coordinates determined by uniform random numbers;

forming, in the virtual processing area, a plurality of dividing lines by a prescribed dividing algorithm, which is an algorithm by which a plurality of dividing lines for dividing a plane are formed on the basis of a plurality of points set on a plane, on a basis of the plurality of generators; and generating, in the virtual processing area, processing instruction data for causing a processing device to perform scraping to realize a first virtual cutting pattern formed by performing virtual scraping along respective dividing lines on a basis of the processing width and the processing shape included in the input information, wherein the information processing method further comprises performing determination processing for determining the input information on a basis of cutting pattern information showing a contact area ratio, a number of contact points, and a processing shape in a desired cutting pattern, in the determination processing, the contact area ratio and the number of contact points are repeatedly calculated until a difference between at least one of the calculated contact area ratio and the calculated number of contact points and a corresponding value in the desired cutting pattern falls within a prescribed range, while changing a value of at least one of the number of generators and a processing width, and, when the difference falls within the prescribed range, the input information based on the number of generators, the processing width, and the processing shape at that time are determined, and the processing instruction data is generated on the basis of the input information determined in the determination processing.

9. An image generation device comprising an image generation unit that performs:

acquiring input information including a number of generators, a processing width, and a processing shape;

setting, in a virtual processing area, a plurality of generators corresponding to the number of generators included in the input information at respective coordinates determined by uniform random numbers;

forming, in the virtual processing area, a plurality of dividing lines by a prescribed dividing algorithm, which is an algorithm by which a plurality of dividing lines for dividing a plane are formed on the basis of a plurality of points set on a plane, on a basis of the plurality of generators; and generating, in the virtual processing area, an image showing a first virtual cutting pattern formed by performing virtual scraping along respective dividing lines on a basis of the processing width and the processing shape included in the input information wherein the controller further performs determination processing for determining the input information on a basis of cutting pattern information showing a contact area ratio, a number of contact points, and a processing shape in a desired cutting pattern, the controller, in the determination processing, repeatedly calculates the contact area ratio and the number of contact points until a difference between at least one of the calculated contact area ratio and the calculated number of contact points and a corresponding value in the desired cutting pattern falls within a prescribed range, while changing a value of at least one of the number of generators and a processing width, and, when the difference falls within the prescribed range, determines the input information based on the number of generators, the processing width, and the processing shape at that time, and the controller generates the image showing the first virtual cutting pattern on the basis of the input information determined in the determination processing.

* * * * *